(12) United States Patent
Priyadarshi et al.

(10) Patent No.: US 10,635,446 B2
(45) Date of Patent: Apr. 28, 2020

(54) RECONFIGURING EXECUTION PIPELINES OF OUT-OF-ORDER (OOO) COMPUTER PROCESSORS BASED ON PHASE TRAINING AND PREDICTION

(71) Applicant: QUALCOMM Incorporated, San Diego, CA (US)

(72) Inventors: Shivam Priyadarshi, Raleigh, NC (US); Anil Krishna, Raleigh, NC (US); Raguram Damodaran, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 419 days.

(21) Appl. No.: 14/863,755

(22) Filed: Sep. 24, 2015

(65) Prior Publication Data

US 2017/0090930 A1   Mar. 30, 2017

(51) Int. Cl.
*G06F 9/38* (2018.01)
*G06F 15/78* (2006.01)
(Continued)

(52) U.S. Cl.
CPC .......... *G06F 9/3867* (2013.01); *G06F 9/3814* (2013.01); *G06F 9/3836* (2013.01);
(Continued)

(58) Field of Classification Search
CPC .... G06F 9/3806; G06F 9/3844; G06F 9/3846; G06F 9/3848
(Continued)

(56) References Cited

U.S. PATENT DOCUMENTS 6,427,206 B1 * 7/2002 Yeh ........................ G06F 9/3844
                                                          712/236
6,502,188 B1 * 12/2002 Zuraski, Jr. ........... G06F 9/3806
                                                          711/125
(Continued)

FOREIGN PATENT DOCUMENTS

WO    2013181012 A1   12/2013

OTHER PUBLICATIONS

Sherwood et al. (T. Sherwood, S. Sair, B. Calder, "Phase tracking and prediction", Proc. 30th Annu. Int. Symp. Computer Architecture, pp. 336-349, 2003.).*

(Continued)

*Primary Examiner* — William B Partridge
(74) *Attorney, Agent, or Firm* — W&T/Qualcomm

(57) ABSTRACT

Reconfiguring execution pipelines of out-of-order (OOO) computer processors based on phase training and prediction is disclosed. In one aspect, a pipeline reconfiguration circuit is communicatively coupled to an execution pipeline providing multiple selectable pipeline configurations. The pipeline reconfiguration circuit generates a phase identifier (ID) for a phase based on a preceding phase. The phase ID is used as an index into an entry of a pipeline configuration prediction (PCP) table to determine whether training for the phase is ongoing. If so, the pipeline reconfiguration circuit performs multiple training cycles, each employing a pipeline configuration from the selectable pipeline configurations for the execution pipeline, to determine a preferred pipeline configuration for the phase. If training for the phase is complete, the pipeline reconfiguration circuit reconfigures the execution pipeline into the preferred pipeline configuration indicated by the entry before the phase is executed.

33 Claims, 11 Drawing Sheets

(51) Int. Cl.
*G06F 11/34* (2006.01)
*G06F 11/30* (2006.01)

(52) U.S. Cl.
CPC ........ *G06F 9/3885* (2013.01); *G06F 11/3024* (2013.01); *G06F 11/3452* (2013.01); *G06F 15/7878* (2013.01); *Y02D 10/12* (2018.01); *Y02D 10/13* (2018.01); *Y02D 10/34* (2018.01)

(58) Field of Classification Search
USPC ................................................ 712/227, 229
See application file for complete search history.

(56) References Cited

U.S. PATENT DOCUMENTS

| | | | |
|---|---|---|---|
| 7,962,770 | B2 | 6/2011 | Capps, Jr. et al. |
| 8,078,832 | B1 | 12/2011 | Agarwal et al. |
| 8,291,201 | B2 | 10/2012 | Schwinn et al. |
| 8,364,937 | B2 | 1/2013 | Moyer et al. |
| 8,806,181 | B1 | 8/2014 | O'Bleness et al. |
| 2005/0044318 | A1* | 2/2005 | Maiyuran ............. G06F 9/3802 711/118 |
| 2006/0004993 | A1* | 1/2006 | Uriu ................... G06F 9/30181 712/226 |
| 2006/0190710 | A1* | 8/2006 | Rychlik ................. G06F 9/325 712/240 |
| 2009/0164812 | A1* | 6/2009 | Capps, Jr. ............ G06F 1/3203 713/320 |
| 2011/0213508 | A1* | 9/2011 | Mandagere .......... G06F 1/3203 700/291 |
| 2012/0084790 | A1* | 4/2012 | Elshishiny ........... G06F 9/4893 718/108 |
| 2014/0075157 | A1 | 3/2014 | Barry et al. |
| 2014/0101396 | A1* | 4/2014 | Bonanno ................ G06F 12/00 711/159 |
| 2014/0181487 | A1* | 6/2014 | Sasanka ................ G06F 9/4401 713/1 |
| 2015/0154021 | A1* | 6/2015 | Padmanabha ....... G06F 9/30058 712/239 |

OTHER PUBLICATIONS

Lau et al. (J. Lau, S. Schoenmackers, B. Calder, "Transition phase classification and prediction", High-Performance Computer Architecture 2005. HPCA-11. 11th International Symposium on, pp. 278-289, Feb. 12-16, 2005.; Hereinafter Lau).*

Jacobson, Quinn, Eric Rotenberg, and James E. Smith. "Path-based next trace prediction." Proceedings of the 30th annual ACM/IEEE international symposium on Microarchitecture. IEEE Computer Society, 1997. (Year: 1997).*

Padmanabha, Shruti, et al. "Trace based phase prediction for tightly-coupled heterogeneous cores." Proceedings of the 46th Annual IEEE/ACM International Symposium on Microarchitecture. ACM, 2013 (Year: 2013).*

Wimmer, Christian, et al. "Phase detection using trace compilation." Proceedings of the 7th International Conference on Principles and Practice of Programming in Java. ACM, 2009. (Year: 2009).*

Vaswani, Kapil, Matthew T. Jacob, and Y. N. Srikant. Representing, Detecting, and Profiling Paths in Hardware. 2004. (Year: 2004).*

Navarro, Tom Conte Nacho, W. Wen-mei, and Theo Ungerer. "High Performance Embedded Architectures and Compilers." (2005). (Year: 2005).*

International Search Report and Written Opinion for PCT/US2016/051087, dated Jan. 31, 2017, 13 pages.

Padmanabha, Shruti et al., "Trace Based Phase Prediction for Tightly-Coupled Heterogeneous Cores," MICRO'46, ACM, Dec. 7-11, 2013, Davis, CA, 12 pages.

Second Written Opinion for PCT/US2016/051087, dated Aug. 29, 2017, 4 pages.

International Preliminary Report on Patentability for PCT/US2016/051087, dated Dec. 13, 2017, 8 pages.

* cited by examiner

| PIPELINE CONFIGURATION PREDICTION (PCP) TABLE (144) | | | |
|---|---|---|---|
| TRAINING STATE INDICATOR | METRIC TRACKING INDICATOR | PREFERRED PIPELINE CONFIGURATION | REUSE COUNT INDICATOR |
| 202(0) | 204(0) | 206(0) | 208(0) |
| ... | ... | ... | ... |
| 202(Z) | 204(Z) | 206(Z) | 208(Z) |

| VALUE OF TRAINING STATE INDICATOR (202(0)) | PIPELINE CONFIGURATION TO USE |
|---|---|
| 0-2: TRAINING ONGOING | PIPELINE CONFIGURATION (402) |
| 3-5: TRAINING ONGOING | PIPELINE CONFIGURATION (404) |
| 6: TRAINED | PREFERRED PIPELINE CONFIGURATION (206(0)) |

*FIG. 4*

RECONFIGURING EXECUTION PIPELINES OF OUT-OF-ORDER (OOO) COMPUTER PROCESSORS BASED ON PHASE TRAINING AND PREDICTION

BACKGROUND

I. Field of the Disclosure

The technology of the disclosure relates generally to optimization of execution pipelines in out-of-order (OOO) computer processors, and in particular, to selective reconfiguration of execution pipelines.

II. Background

Out-of-order (OOO) computer processors are processors that are capable of executing computer program instructions in an order determined by an availability of input operands for each instruction, regardless of the order of appearance of the instructions in the computer program. By executing instructions out of order, an OOO computer processor may be able to fully utilize processor clock cycles that would otherwise be wasted while the OOO computer processor waits for data access operations to complete. For example, instead of having to "stall" (i.e., intentionally introduce a processing delay) instructions in an execution pipeline while input data is retrieved for an older program instruction, the OOO computer processor may proceed with executing a more recently fetched instruction that is able to execute immediately. In this manner, processor clock cycles may be more productively utilized by the OOO computer processor, resulting in an increase in the number of instructions that the OOO computer processor is capable of processing per processor clock cycle.

In a conventional OOO computer processor, the "back-end pipeline" of each execution pipeline includes hardware that enables such functionality as register renaming, register file access, booking into reservation stations (RSVs), booking into and committing out of instruction ordering structures, instruction wakeup and selection from the RSVs, and instruction execution by execution units (e.g., Arithmetic Logic Units (ALUs)). Because the back-end pipeline is designed to extract maximum performance in all program phases, it may be overprovisioned in program phases having low instruction-level parallelism, a large number of mispredicted branches, and/or a large number of instruction refetching due to hazards, as non-limiting examples. This may result in higher processor power consumption, which in turn may reduce battery life and reliability, and may increase the cost for power delivery network design, packaging, and cooling.

One conventional technique for reducing power consumption is to proportionately reduce the performance of the OOO computer processor. However, processor performance requirements have increased with every new generation of OOO computer processors. Consequently, intentionally degrading processor performance as a power-saving technique is not an ideal solution. It is thus desirable to provide a mechanism for improving energy efficiency by reducing the power consumption of back-end pipelines in OOO computer processors with minimal performance loss.

SUMMARY OF THE DISCLOSURE

Aspects disclosed in the detailed description include reconfiguring execution pipelines of out-of-order (OOO) computer processors based on phase training and prediction. It is recognized that different phases (i.e., groups of a given number of committed instructions) within an instruction stream being executed by an OOO computer processor may achieve efficient performance using different execution pipeline configurations. Accordingly, in this regard, a pipeline reconfiguration circuit is provided as an element of an OOO computer processor. The pipeline reconfiguration circuit is communicatively coupled to an execution pipeline of the OOO computer processor that provides multiple selectable pipeline configurations. As non-limiting examples, the selectable pipeline configurations may include multiple execution pipeline issue width configurations, multiple reservation station bank configurations, and/or multiple instruction ordering configurations.

For each phase, the pipeline reconfiguration circuit first generates a phase identifier (ID) for a preceding phase. According to some aspects, the phase ID may include a hash of one or more committed instructions within the preceding phase (such as a not-taken conditional backward branch instructions, backward call instructions, and/or backward return instructions, as non-limiting examples), and may also incorporate path history in the form of previously generated phase IDs. The phase ID is used as an index to access an entry in a pipeline configuration prediction (PCP) table provided by the pipeline reconfiguration circuit. Based on a training state indicator for the entry, the pipeline reconfiguration circuit determines whether training for the phase is ongoing. If so, the pipeline reconfiguration circuit performs multiple training cycles, each employing a pipeline configuration from the selectable pipeline configurations for the execution pipeline, to determine a preferred pipeline configuration for the phase. In some aspects, operations for performing the training cycles may include reconfiguring the execution pipeline into the selected pipeline configuration, and measuring a performance metric after the phase is executed. The pipeline reconfiguration circuit may then update the training state indicator to a next training state. If the training state indicator for the entry indicates that training for the phase is complete, the pipeline reconfiguration circuit reconfigures the execution pipeline into the preferred pipeline configuration indicated by the entry before executing the phase. In this manner, the pipeline reconfiguration circuit may use the phase ID for a previous phase to predict an oncoming phase, and, based on the results of the training cycles, may configure the execution pipeline into an optimal configuration for the oncoming phase, thus improving power efficiency while minimizing impact on processor performance.

In another aspect, a pipeline reconfiguration circuit of an OOO computer processor is provided. The pipeline reconfiguration circuit comprises a PCP table comprising a plurality of entries. The pipeline reconfiguration circuit is communicatively coupled to an execution pipeline that provides a plurality of selectable pipeline configurations. For each phase of a plurality of phases of committed instructions within the execution pipeline, the pipeline reconfiguration circuit is configured to generate a phase ID for a preceding phase immediately prior to the phase. The pipeline reconfiguration circuit is further configured to determine whether a training state indicator of an entry corresponding to the phase ID among the plurality of entries of the PCP table indicates that training for the phase is ongoing. The pipeline reconfiguration circuit is also configured to, responsive to determining that the training state indicator for the entry indicates that training for the phase is ongoing, perform a plurality of training cycles each using a pipeline configuration selected from among the plurality of selectable pipeline configurations of the execution pipeline to determine a preferred pipeline configuration. The pipeline reconfiguration circuit is further configured to, responsive to determining that the training state indicator for the entry indicates that training for the phase is not ongoing, reconfigure the execution pipeline into the preferred pipeline configuration indicated by the entry.

In another aspect, an OOO processor-based system is provided. The OOO processor-based system comprises an execution pipeline that provides a plurality of selectable pipeline configurations. The OOO processor-based system further comprises a pipeline reconfiguration circuit comprising a PCP table comprising a plurality of entries, and communicatively coupled to the execution pipeline. For each phase of a plurality of phases of committed instructions within the execution pipeline, the pipeline reconfiguration circuit is configured to generate a phase ID for a preceding phase immediately prior to the phase. The pipeline reconfiguration circuit is further configured to determine whether a training state indicator of an entry corresponding to the phase ID among the plurality of entries of the PCP table indicates that training for the phase is ongoing. The pipeline reconfiguration circuit is also configured to, responsive to determining that the training state indicator for the entry indicates that training for the phase is ongoing, perform a plurality of training cycles each using a pipeline configuration selected from among the plurality of selectable pipeline configurations of the execution pipeline to determine a preferred pipeline configuration. The pipeline reconfiguration circuit is further configured to, responsive to determining that the training state indicator for the entry indicates that training for the phase is not ongoing, reconfigure the execution pipeline into the preferred pipeline configuration indicated by the entry.

In another aspect, a pipeline reconfiguration circuit of an OOO computer processor is provided. The pipeline reconfiguration circuit comprises, for each phase of a plurality of phases of committed instructions within an execution pipeline of an OOO computer processor, a means for generating a phase ID for a preceding phase immediately prior to the phase. The pipeline reconfiguration circuit further comprises a means for determining whether a training state indicator of an entry corresponding to the phase ID among a plurality of entries of a PCP table indicates that training for the phase is ongoing. The pipeline reconfiguration circuit also comprises a means for performing a plurality of training cycles each using a pipeline configuration selected from among a plurality of selectable pipeline configurations of the execution pipeline to determine a preferred pipeline configuration, responsive to determining that the training state indicator for the entry indicates that training for the phase is ongoing. The pipeline reconfiguration circuit further comprises a means for reconfiguring the execution pipeline into the preferred pipeline configuration indicated by the entry, responsive to determining that the training state indicator for the entry indicates that training for the phase is not ongoing.

In another aspect, a method of reconfiguring an execution pipeline of an OOO computer processor is provided. The method comprises, for each phase of a plurality of phases of committed instructions within an execution pipeline of an OOO computer processor, generating, by a pipeline reconfiguration circuit, a phase ID for a preceding phase immediately prior to the phase. The method further comprises determining whether a training state indicator of an entry corresponding to the phase ID among a plurality of entries of a PCP table indicates that training for the phase is ongoing. The method also comprises, responsive to determining that the training state indicator for the entry indicates that training for the phase is ongoing, performing a plurality of training cycles each using a pipeline configuration selected from among a plurality of selectable pipeline configurations of the execution pipeline to determine a preferred pipeline configuration. The method further comprises, responsive to determining that the training state indicator for the entry indicates that training for the phase is not ongoing, reconfiguring the execution pipeline into the preferred pipeline configuration indicated by the entry.

BRIEF DESCRIPTION OF THE FIGURES

FIG. 2 is a block diagram illustrating exemplary contents of a pipeline configuration prediction (PCP) table of the pipeline reconfiguration circuit of FIG. 1;

FIG. 4 is a block diagram illustrating exemplary logic for performing training cycles by the pipeline reconfiguration circuit of FIG. 1;

DETAILED DESCRIPTION

Figure 1:
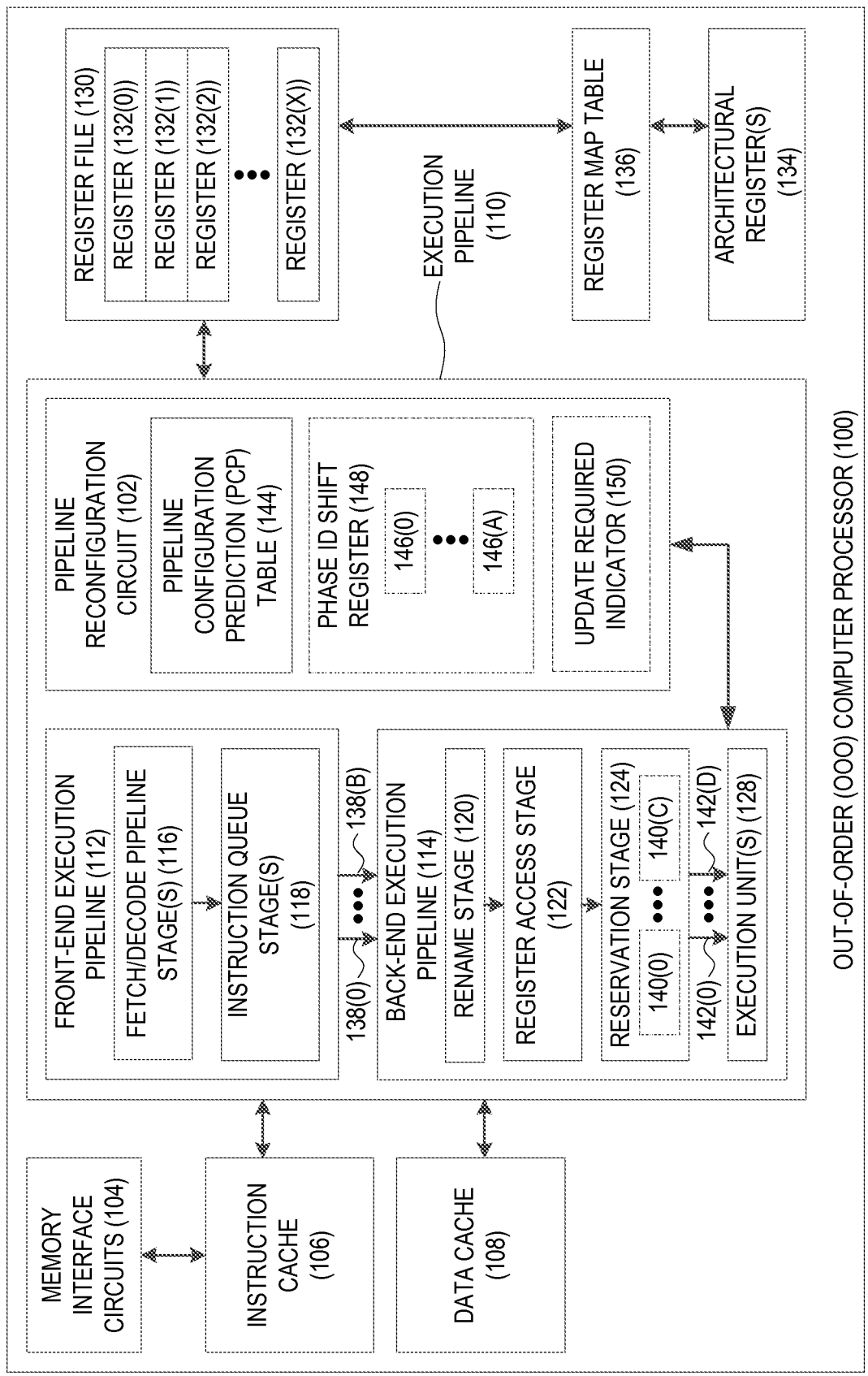
FIG. 1 is a block diagram of an exemplary out-of-order (OOO) computer processor including a pipeline reconfiguration circuit for reconfiguring execution pipelines based on phase training and prediction.

With reference now to the drawing figures, several exemplary aspects of the present disclosure are described. The word "exemplary" is used herein to mean "serving as an example, instance, or illustration." Any aspect described herein as "exemplary" is not necessarily to be construed as preferred or advantageous over other aspects.

Aspects disclosed in the detailed description include reconfiguring execution pipelines of out-of-order (OOO) computer processors based on phase training and prediction. In this regard, a pipeline reconfiguration circuit is provided as an element of an OOO computer processor. For each phase within an instruction stream, the pipeline reconfiguration circuit first generates a phase identifier (ID) for a preceding phase, and uses an index of the phase ID to access an entry in a pipeline configuration prediction (PCP) table. Based on a training state indicator for the entry, the pipeline reconfiguration circuit determines whether training for the phase is ongoing. If so, the pipeline reconfiguration circuit performs multiple training cycles, each employing a pipeline configuration from selectable pipeline configurations for the execution pipeline, to determine a preferred pipeline configuration for the phase. If the training state indicator for the entry indicates that training for the phase is complete, the pipeline reconfiguration circuit reconfigures the execution pipeline into the preferred pipeline configuration indicated by the entry before executing the phase.

In this regard, FIG. 1 is a block diagram of an exemplary OOO computer processor 100 including a pipeline reconfiguration circuit 102 providing phase training and prediction, as disclosed herein. The OOO computer processor 100 includes memory interface circuits 104, an instruction cache 106, and a data cache 108. The OOO computer processor 100 may encompass any one of known digital logic elements, semiconductor circuits, processing cores, and/or memory structures, among other elements, or combinations thereof. Aspects described herein are not restricted to any particular arrangement of elements, and the disclosed techniques may be easily extended to various structures and layouts on semiconductor dies or packages.

The OOO computer processor 100 further comprises an execution pipeline 110, which may be subdivided into a front-end execution pipeline 112 and a back-end execution pipeline 114. As used herein, the "front-end execution pipeline 112" may refer to pipeline stages that are conventionally located at the "beginning" of the execution pipeline 110, and that provide fetching, decoding, and/or instruction queueing functionality. In this regard, the front-end execution pipeline 112 of FIG. 1 includes one or more fetch/decode pipeline stages 116 and one or more instruction queue stages 118. As non-limiting examples, the one or more fetch/decode pipeline stages 116 may include F1, F2, and/or F3 fetch/decode stages (not shown). The "back-end execution pipeline 114" refers herein to subsequent pipeline stages of the execution pipeline 110 for issuing instructions for execution, for carrying out the actual execution of instructions, and/or for loading and/or storing data required by or produced by instruction execution. In the example of FIG. 1, the back-end execution pipeline 114 comprises a rename stage 120, a register access stage 122, a reservation stage 124, and one or more execution units 128. It is to be understood that the stages 116, 118 of the front-end execution pipeline 112 and the elements 120, 122, 124, 128 of the back-end execution pipeline 114 shown in FIG. 1 are provided for illustrative purposes only, and that other aspects of the OOO computer processor 100 may contain additional or fewer pipeline stages than illustrated herein.

The OOO computer processor 100 additionally includes a register file 130, which provides physical storage for a plurality of registers 132(0)-132(X). In some aspects, the registers 132(0)-132(X) may comprise one or more general purpose registers (GPRs), a program counter, and/or a link register. During execution of computer programs by the OOO computer processor 100, the registers 132(0)-132(X) may be mapped to one or more architectural registers 134 using a register map table 136.

In exemplary operation, the front-end execution pipeline 112 of the execution pipeline 110 fetches instructions (not shown) from the instruction cache 106, which in some aspects may be an on-chip Level 1 (L1) cache, as a non-limiting example. Instructions may be further decoded by the one or more fetch/decode pipeline stages 116 of the front-end execution pipeline 112 and passed to the one or more instruction queue stages 118 pending issuance to the back-end execution pipeline 114. After the instructions are issued to the back-end execution pipeline 114, the elements 120, 122, 124, 128 of the back-end execution pipeline 114 then execute the issued instructions, and retire the executed instructions.

As discussed above, the OOO computer processor 100 may provide OOO processing of instructions to increase instruction processing parallelism. To better tailor the processing capabilities of the execution pipeline 110 to workloads having varying characteristics, the execution pipeline 110 may support multiple different pipeline configurations. For example, in some aspects, the execution pipeline 110 may support multiple execution pipeline issue width configurations, in which one or more issue paths 138(0)-138(B), through which instructions may enter the back-end execution pipeline 114, and corresponding internal elements (not shown) of the rename stage 120 and/or the register access stage 122, may be enabled or disabled. For phases having low instruction-level parallelism, power requirements for the back-end execution pipeline 114 may be reduced without degrading processor performance by employing an execution pipeline issue width configuration having a reduced issue width. Reducing the issue width may also conserve energy for phases with high branch misprediction levels by restricting the "wrong" path instruction from entering the back-end execution pipeline 114, and by reducing unnecessary reads to the register file 130.

Some aspects of the execution pipeline 110 may support multiple different reservation station (RSV) bank configurations. The reservation stage 124 of the back-end execution pipeline 114 may include a plurality of RSV banks 140(0)-140(C), each of which may include multiple RSVs (not shown) that serve as buffers for instructions awaiting execution. Each instruction may remain in an RSV until all of its source operands (not shown) are available, at which point the instruction may be made available for dispatch to the execution unit(s) 128 via one of a plurality of dispatch lanes 142(0)-142(D). By selecting an RSV bank configuration of the execution pipeline 110 in which one or more of the RSV banks 140(0)-140(C) are disabled, power savings may be realized in a number of different ways. Energy consumption by selection logic associated with each disabled RSV bank 140(0)-140(C) may be eliminated, while power used in booking instructions into the disabled RSV banks 140(0)-140(C) and by performing wakeup operations for the disabled RSV banks 140(0)-140(C) may be conserved. Additionally, by disabling an RSV bank 140(0)-140(C), physical register file (PRF) tag broadcasts from instructions in the execution unit(s) 128 may be prevented, thereby saving the associated interconnect switching power. Interconnect switching power may be further reduced by preventing result data broadcasts from completed instructions to the disabled RSV banks 140(0)-140(C).

According to some aspects, the execution pipeline 110 may support multiple instruction ordering configurations (i.e., in-order versus out-of-order instruction dispatching). While dispatching instructions out of order may improve the performance of the OOO computer processor 100 for phases having a high degree of instruction level parallelism (ILP), out-of-order instruction dispatching requires increased scheduling logic, which results in higher power consumption. If a phase has a very low ILP, instruction dispatching may be naturally serialized, and power consumed by the scheduling logic for supporting out-of-order dispatching may be wasted. Accordingly, by using an instruction ordering configuration providing in-order dispatching, power savings may be achieved in low-ILP phases.

It is to be understood that, in some aspects, the execution pipeline 110 may support the use of more than one of the pipeline configurations described above in combination. For example, in some aspects, a reduction in issue width may be synergistic with disabling some of the RSV banks 140(0)-140(C), as a narrower issue width may reduce pressure on the RSV banks 140(0)-140(C). Accordingly, the execution pipeline 110 may provide for the use of multiple different issue width configurations in conjunction with the use of multiple different RSV bank configurations. The execution pipeline 110 may also provide additional pipeline configurations in addition to or instead of the pipeline configurations discussed above. As non-limiting examples, aspects of the execution pipeline 110 that provide a hardware prefetcher (not shown), a branch predictor (not shown), and/or a memory dependence predictor (not shown) may support multiple hardware prefetcher setting configurations, multiple branch predictor setting configurations, and/or multiple memory dependence predictor aggressiveness setting configurations, respectively.

Each of the pipeline configurations discussed above may improve energy efficiency for some phases of instructions being executed by the execution pipeline 110. However, because the power savings provided depends on the particular characteristics of each phase, it is desirable to select an appropriate pipeline configuration for a given phase to achieve energy efficiency while minimizing impact on processor performance.

In this regard, the OOO computer processor 100 provides the pipeline reconfiguration circuit 102. As discussed in greater detail below, the pipeline reconfiguration circuit 102 is configured to perform multiple training cycles for each phase of committed instructions being processed by the execution pipeline 110, with each training cycle using one of the multiple pipeline configurations provided by the execution pipeline 110. The pipeline reconfiguration circuit 102 provides a PCP table 144 containing entries (not shown) to store intermediate results (e.g., performance metrics measured during each training cycle, as non-limiting examples), and to store a preferred pipeline configuration that is determined based on the training cycles. Upon subsequent detection of a phase, the pipeline reconfiguration circuit 102 reconfigures the execution pipeline 110 using the preferred pipeline configuration for the phase, as indicated by the corresponding entry in the PCP table 144.

Entries in the PCP table 144 are indexed using a phase ID, which, in some aspects, may be based on a hash of program counters (PCs) of committed instructions within a preceding phase immediately prior to the phase for which training will be performed. Some aspects may also incorporate path history by basing the phase ID on a plurality of generated phase IDs 146(0)-146(A) (e.g., phase IDs generated for previous phases) that are stored in an optional phase ID shift register 148. The pipeline reconfiguration circuit 102 may further provide an optional update required indicator 150. As described in greater detail below, the update required indicator 150 may be used in some aspects of the pipeline reconfiguration circuit 102 to optimize performance by avoiding unnecessary updates to the PCP table 144 after execution of a phase.

Before describing in detail the operations of the pipeline reconfiguration circuit 102 for performing execution pipeline reconfiguration based on phase training and prediction, the internal structure of an exemplary PCP table 144 will be discussed with respect to FIG. 2. Operations for generating a phase ID prior to execution of a phase, performing training cycles for the phase to determine a preferred pipeline configuration, and updating an entry within the PCP table 144 following execution of a phase will then be discussed with respect to FIGS. 3, 4, and 5, respectively.

In this regard, FIG. 2 illustrates the fields comprising the exemplary PCP table 144. As seen in FIG. 2, the PCP table 144 includes multiple entries 200(0)-200(Z), each corresponding to a potential trace ID value. Each of the entries 200(0)-200(Z) includes a corresponding training state indicator 202(0)-202(Z), which represents a current training state for a phase associated with the entry 200(0)-200(Z). In some aspects, each training state indicator 202(0)-202(Z) may comprise a plurality of bits used to distinguish between a predetermined number of training states. For example, training state indicators 202(0)-202(Z) comprising three (3) bits may be used to distinguish between seven (7) training states, which may include three (3) training states using a "wide" pipeline configuration (e.g., having a full issue width and/or RSV bank utilization), three (3) training states using a "narrow" pipeline configuration (e.g., having a reduced issue width and/or RSV bank utilization), and one (1) training state to indicate that training is complete. It is to be understood that the training state indicators 202(0)-202(Z) may indicate more or fewer training states than described above.

Each of the entries 200(0)-200(Z) of the PCP table 144 also includes a corresponding metric tracking indicator 204(0)-204(Z). Each metric tracking indicator 204(0)-204(Z) is used to maintain a running average of a measured performance metric that is tracked during each training cycle and used to compare pipeline configurations. As a non-limiting example, the measured performance metric may comprise an execution cycle count. In some aspects, each of the metric tracking indicators 204(0)-204(Z) may comprise fourteen (14) bits to have sufficient fidelity in the measured performance metric average to capture a one percent (1%) change in an average execution cycle count for a phase.

The entries 200(0)-200(Z) of the PCP table 144 further include corresponding preferred pipeline configurations 206(0)-206(Z). During training, the preferred pipeline configurations 206(0)-206(Z) may indicate a next pipeline configuration to be used, based on the corresponding training state indicator 202(0)-202(Z). Once training is complete for an entry 200(0)-200(Z), the preferred pipeline configuration 206(0)-206(Z) may indicate a pipeline configuration determined by the training cycles to be appropriate for the phase corresponding to the entry 200(0)-200(Z). Each of the preferred pipeline configurations 206(0)-206(Z) contains sufficient bits to represent all of the possible pipeline configurations to be used during the training cycles. As a non-limiting example, if the training cycles will use only two (2) pipeline configurations (e.g., the "wide" and "narrow" pipeline configurations referenced above), then each of the preferred pipeline configurations 206(0)-206(Z) may comprise a single bit.

In some aspects, as each of the entries 200(0)-200(Z) in the PCP table 144 are trained, resetting the training state indicators 202(0)-202(Z) back to an initial state to initiate retraining of a phase may require a fortuitous replacement of the entry 200(0)-200(Z) due to capacity or associativity reasons. Accordingly, the pipeline reconfiguration circuit 102 may provide one or more retraining strategies to refresh the entries 200(0)-200(Z). Under one approach, the pipeline reconfiguration circuit 102 may implement global retraining, wherein all of the entries 200(0)-200(Z) of the PCP table 144 are periodically invalidated by initializing all of the training state indicators 202(0)-202(Z) to force retraining.

Some aspects may provide another, more granular approach, under which optional reuse count indicators 208(0)-208(Z) are provided for the entries 200(0)-200(Z) of the PCP table 144. The reuse count indicators 208(0)-208(Z) may be used in some aspects to provide selective retraining of the entries 200(0)-200(Z) after a specified number of usages. In exemplary operation, each of the reuse count indicators 208(0)-208(Z) may be incremented each time the corresponding preferred pipeline configuration 206(0)-206(Z) is used after training for the associated entry 200(0)-200(Z) is complete. When a reuse count indicator 208(0)-

208(Z) reaches a threshold value (e.g., when the reuse count indicator 208(0)-208(Z) saturates), the corresponding entry 200(0)-200(Z) may be invalidated by the pipeline reconfiguration circuit 102 of FIG. 1. This may be accomplished, for instance, by resetting the associated training state indicator 202(0)-202(Z) to an initial state and resetting the reuse count indicator 208(0)-208(Z) itself, thus forcing the preferred pipeline configuration 206(0)-206(Z) to be relearned.

It is to be understood that some aspects may provide that the pipeline reconfiguration circuit 102 and/or the entries 200(0)-200(Z) of the PCP table 144 may include other fields in addition to the fields illustrated in FIG. 2. As a non-limiting example, a register may be provided in some aspects to count a number of execution cycles that were used to execute a phase. In such aspects, the register may comprise a same number of bits as the metric tracking indicators 204(0)-204(Z) of the entries 200(0)-200(Z) of the PCP table 144. It is to be further understood that the exemplary PCP table 144 in some aspects may be implemented as a cache configured according to associativity and replacement policies known in the art. In the example of FIG. 2, the exemplary PCP table 144 is illustrated as a single data structure. However, in some aspects, the exemplary PCP table 144 may also comprise more than one data structure or cache.

Figure 3:
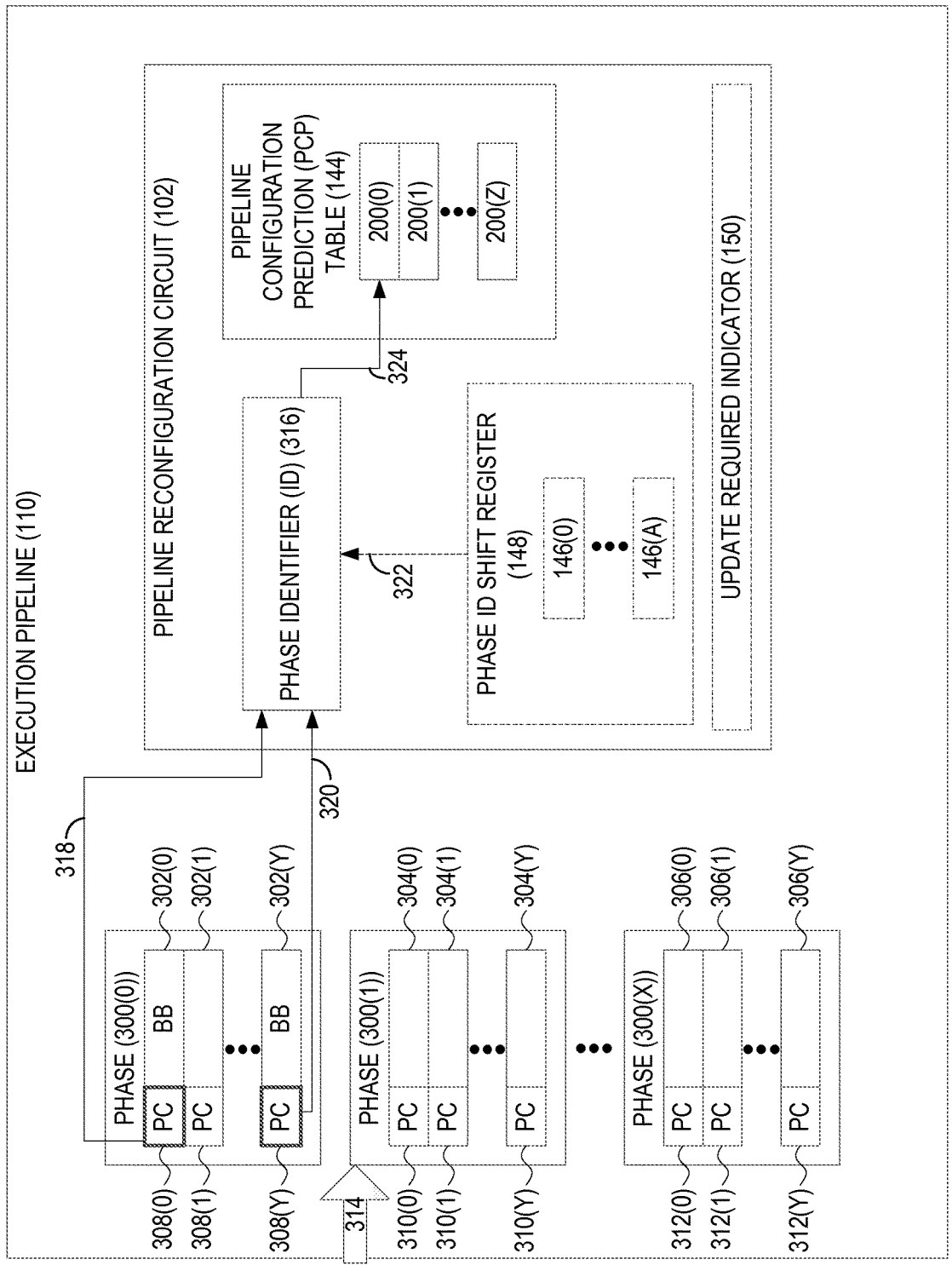
FIG. 3 is a block diagram illustrating exemplary communications flows within the pipeline reconfiguration circuit of FIG. 1 for generating a phase identifier (ID) prior to execution of a phase.

FIG. 3 is a block diagram illustrating exemplary communications flows within the pipeline reconfiguration circuit 102 of FIG. 1 for generating a phase ID prior to execution of a phase, and for accessing a corresponding entry 200(0)-200(Z) in the PCP table 144 of FIG. 2 for training based on the phase ID. In the example of FIG. 3, the execution pipeline 110 processes a sequence of phases 300(0), 300(1), and 300(X), comprising committed instructions 302(0)-302(Y), 304(0)-304(Y), and 306(0)-306(Y), respectively. The committed instructions 302(0)-302(Y), 304(0)-304(Y), 306(0)-306(Y) are associated with corresponding PCs 308(0)-308(Y), 310(0)-310(Y), and 312(0)-312(Y).

As execution of the phase 300(1) is about to begin at an execution point indicated by arrow 314, the pipeline reconfiguration circuit 102 generates a phase ID 316 for the preceding phase 300(0). Note that the phase ID 316 is generated based on the preceding phase 300(0) rather than the phase 300(1), because only information related to the contents of the preceding phase 300(0) is available at the execution point indicated by arrow 314. According to some aspects, the pipeline reconfiguration circuit 102 may generate the phase ID 316 by hashing a plurality of the PCs 308(0)-308(Y) of a plurality of the committed instructions 302(0)-302(Y) of the preceding phase 300(0). In the example of FIG. 3, the phase ID 316 is generated by hashing the PCs 308(0) and 308(Y) corresponding to the committed instructions 302(0) and 302(Y), as indicated by arrows 318 and 320. The committed instructions 302(0) and 302(Y) are used to generate the phase ID 316 because they comprise unique backward branch (BB) instructions 302(0) and 302(Y) (e.g., not-taken conditional backward branch instructions, backward call instructions, and/or backward return instructions), which may tend to act as global convergence points during execution of a phase. Using only the backward branch instructions 302(0) and 302(Y) may enable the phase ID 316 to be compact without compromising phase identification, thereby maintaining good prediction accuracy, providing fast predictor warmup, and limiting the chances of aliasing. In some aspects, all of the unique backward branch instructions 302(0) and 302(Y) within the phase 300(0) may be incorporated into the phase ID 316, while some aspects may provide that the phase ID 316 is based on only a subset of the most recent backward branch instructions 302(0) and 302(Y).

In order to add even more context to the phase ID 316, the pipeline reconfiguration circuit 102 according to some aspects may also incorporate a plurality of generated phase IDs 146(0)-146(A) provided by the phase ID shift register 148, as indicated by arrow 322. In this manner, the path history context (i.e., the sequence of older phases 300 that led to the phase 300(0)) may influence the phase ID 316, to account for the possibility that such path history context may influence the preferred pipeline configuration 206(0) for the phase 300(1).

The pipeline reconfiguration circuit 102 then uses the phase ID 316 as an index into the PCP table 144 to access the entry 200(0), as indicated by arrow 324. In some aspects, the pipeline reconfiguration circuit 102 may determine whether the entry 200(0) corresponding to the phase ID 316 is currently in use. If not, the pipeline reconfiguration circuit 102 may initialize the training state indicator 202(0) for the entry 200(0).

FIG. 4 illustrates a table 400 of logical rules that may be applied by the pipeline reconfiguration circuit 102 upon accessing the entry 200(0) in the PCP table 144 to determine whether training for a preferred pipeline configuration 206(0) for the entry 200(0) is ongoing, or whether training is complete for the phase 300(1). In the example of FIG. 4, it is assumed that there are two (2) pipeline configurations 402 and 404 with which training of the phase 300(0) corresponding to the entry 200(0) of FIG. 3 will be performed. In some aspects, the pipeline configurations 402 and 404 may correspond to the "wide" and "narrow" pipeline configurations referenced above.

In this example, the phase 300(0) will be trained three (3) times using the pipeline configuration 402, and three (3) times using the pipeline configuration 404. Thus, as shown in row 406 of the table 400, if the pipeline reconfiguration circuit 102 determines that the value of the training state indicator 202(0) of the entry 200(0) ranges from zero (0) to two (2), the pipeline reconfiguration circuit 102 will select the pipeline configuration 402 for training. As seen in row 408 of the table 400, if the value of the training state indicator 202(0) of the entry 200(0) ranges from three (3) to five (5), the pipeline reconfiguration circuit 102 will select the pipeline configuration 404 for training. Finally, as shown in row 410, if the value of the training state indicator 202(0) of the entry 200(0) is six (6), training has been completed, and the pipeline configuration 402, 404 indicated by the preferred pipeline configuration 206(0) will be selected.

Figure 5:
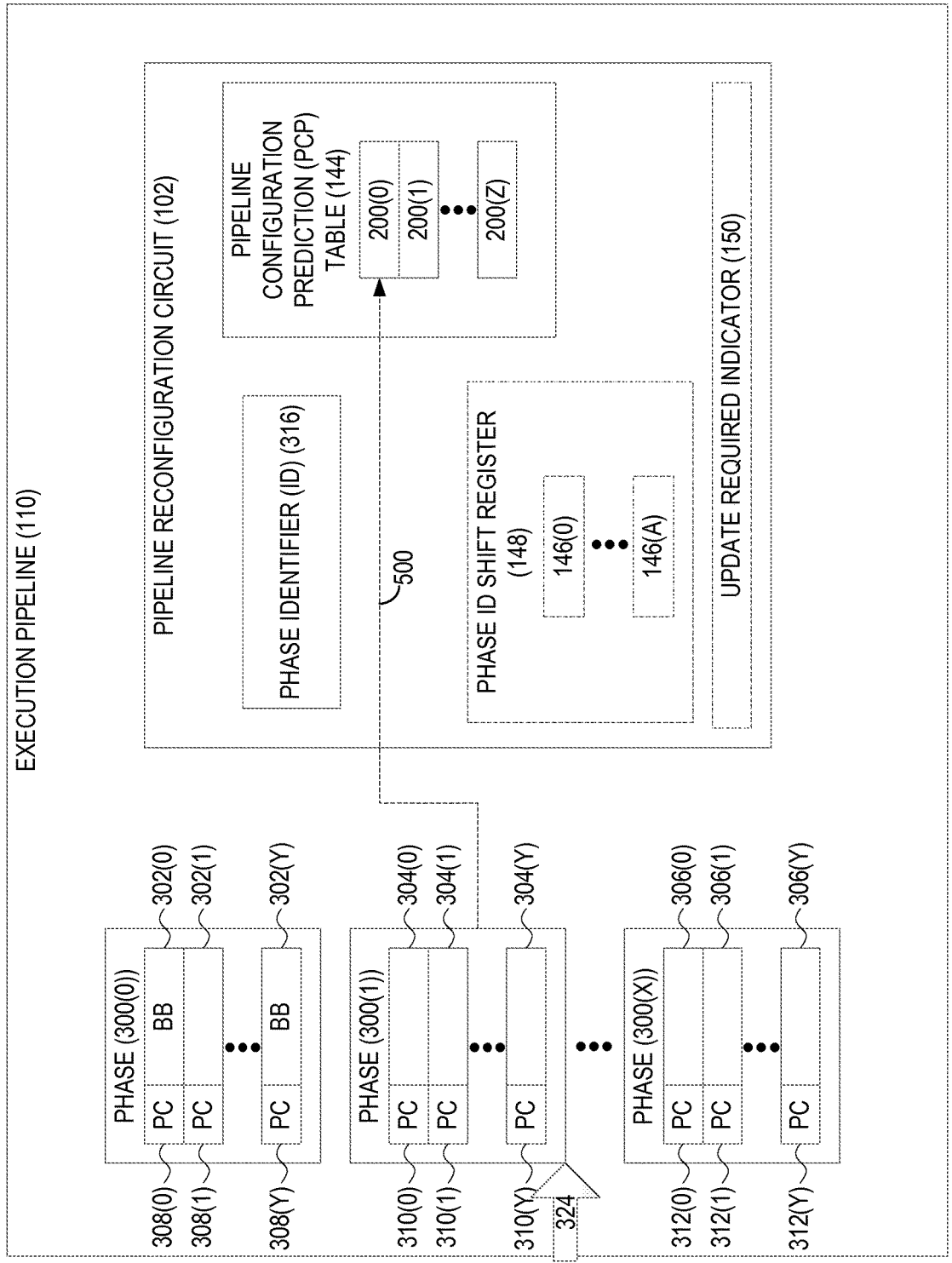
FIG. 5 is a block diagram illustrating exemplary communications flows within the pipeline reconfiguration circuit of FIG. 1 for updating an entry within the PCP table following execution of a phase.

FIG. 5 is a block diagram illustrating exemplary communications flows within the pipeline reconfiguration circuit 102 of FIG. 1 for updating the entry 200(0) within the PCP table 144 following execution of the phase 300(1), using the logic illustrated in FIG. 4 as an example. In some aspects, the pipeline reconfiguration circuit 102 may reconfigure the execution pipeline 110 of FIG. 3 using the pipeline configurations 402, 404 or the preferred pipeline configuration 206(0) selected as described above. After the phase 300(1) has completed execution at the point indicated by arrow 324, the pipeline reconfiguration circuit 102 may access the training state indicator 202(0) for the entry 200(0) using the same phase ID 316 generated at the beginning of the phase 300(1). If the training state indicator 202(0) indicates that training is ongoing (i.e., a value of the training state indicator 202(0) is in the range from zero (0) to five (5)), the pipeline reconfiguration circuit 102 may measure a performance metric 500 of the selected pipeline configuration 402, 404 that was used. In some aspects, the measured performance metric 500 may comprise a count of execution cycles used to execute the phase 300(1).

The metric tracking indicator 204(0) of the entry 200(0) corresponding to the same phase ID 316 generated at the beginning of the phase 300(1) may then be updated based on the measured performance metric 500. Some aspects may provide that updating the metric tracking indicator 204(0) may comprise computing an average based on the measured performance metric 500 and the metric tracking indicator 204(0), and storing the average as the metric tracking indicator 204(0). The pipeline reconfiguration circuit 102 may then update the training state indicator 202(0) for the entry 200(0) to indicate a next training state.

In some aspects, training cycles may be terminated early if the measured performance metric 500 indicates that excessive performance degradation has occurred during a training cycle using the pipeline configuration 404. For example, if the training state indicator 202(0) is three (3) or four (4), and the pipeline reconfiguration circuit 102 determines that the measured performance metric 500 has degraded by more than a certain percentage (e.g., one percent (1%), as a non-limiting example) relative to the metric tracking indicator 204(0), the pipeline reconfiguration circuit 102 may update the preferred pipeline configuration 206(0) to indicate that the pipeline configuration 402 is preferred. The pipeline reconfiguration circuit 102 may further update the training state indicator 202(0) to a value of six (6) to indicate that training is complete. However, if the training state indicator 202(0) reaches a value of five (5) without the measured performance metric 500 degrading below the specified percentage, the pipeline reconfiguration circuit 102 may update the preferred pipeline configuration 206(0) to indicate that the pipeline configuration 404 is preferred.

Note that, if the training state indicator 202(0) has a value of six (6), the PCP table 144 does not need to be updated in the example of FIG. 5. The performance of the pipeline reconfiguration circuit 102 thus may be improved in some aspects by using the update required indicator 150 to indicate, at the time the phase ID 316 is generated and the entry 200(0) of the PCP table 144 is first accessed, whether the training state indicator 202(0) has already reached a value of six (6). Before updating the entry 200(0) of the PCP table 144 at the end of the phase 300(1), the update required indicator 150 may be consulted by the pipeline reconfiguration circuit 102, and the PCP table 144 may only be updated if the update required indicator 150 is set.

Figure 6A:
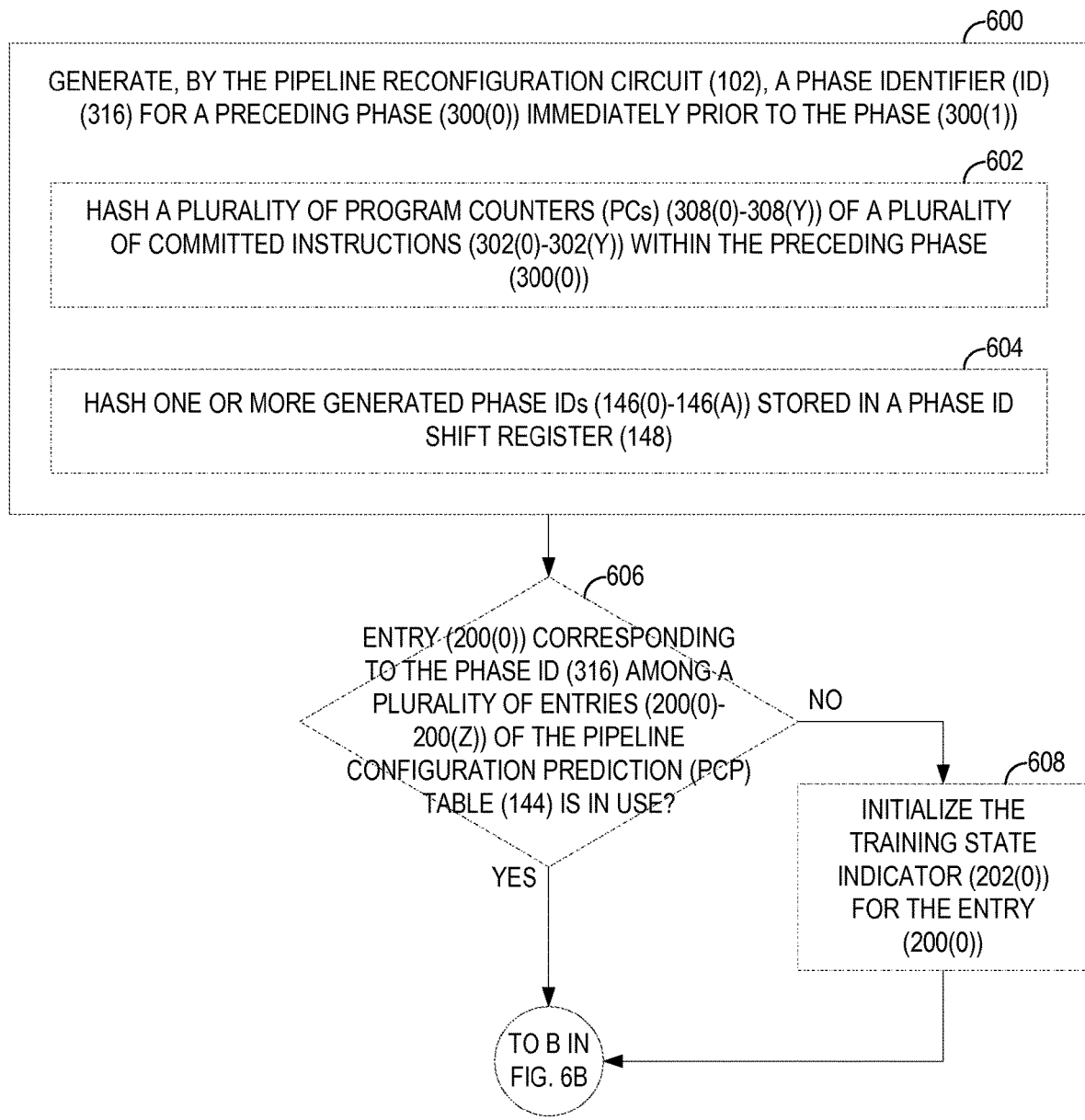
FIGS. 6A-6D are flowcharts illustrating exemplary operations for reconfiguring execution pipelines based on phase training and prediction.

FIGS. 6A-6D are flowcharts illustrating exemplary operations for reconfiguring execution pipelines based on phase training and prediction. In describing FIGS. 6A-6D, elements of FIGS. 1-5 are referenced for the sake of clarity. The operations illustrated in FIGS. 6A-6D may be carried out for each phase 300(1) of a plurality of phases 300(0)-300(X) of committed instructions 302(0)-302(Y) within an execution pipeline 110 of an OOO computer processor 100. In FIG. 6A, operations begin with the pipeline reconfiguration circuit 102 generating a phase ID 316 for a preceding phase 300(0) immediately prior to the phase 300(1) (block 600). In this regard, the pipeline reconfiguration circuit 102 may be referred to herein as "a means for generating a phase ID for a preceding phase immediately prior to the phase." In some aspects, operations of block 600 may include the pipeline reconfiguration circuit 102 hashing a plurality of PCs 308(0)-308(Y) of a plurality of committed instructions 302(0)-302(Y) within the preceding phase 300(0) (block 602). Accordingly, the pipeline reconfiguration circuit 102 may be referred to herein as "a means for hashing a plurality of program counters of a plurality of committed instructions within the preceding phase." Some aspects may provide that operations of block 600 may include the pipeline reconfiguration circuit 102 hashing one or more generated phase IDs 146(0)-146(A) stored in a phase ID shift register 148 (block 604). The pipeline reconfiguration circuit 102 thus may be referred to herein as "a means for hashing one or more generated phase IDs stored in a phase ID shift register."

According to some aspects, the pipeline reconfiguration circuit 102 may determine whether the entry 200(0) corresponding to the phase ID 316 among the plurality of entries 200(0)-200(Z) of the PCP table 144 is in use (block 606). In this regard, the pipeline reconfiguration circuit 102 may be referred to herein as "a means for determining, prior to determining whether the training state indicator of the entry corresponding to the phase ID among the plurality of entries of the PCP table indicates that training for the phase is ongoing, whether the entry corresponding to the phase ID in the PCP table is in use." If it is determined at decision block 606 that the entry 200(0) is not in use, the pipeline reconfiguration circuit 102 may initialize the training state indicator 202(0) for the entry 200(0) (block 608). Accordingly, the pipeline reconfiguration circuit 102 may be referred to herein as "a means for initializing the training state indicator for the entry responsive to determining that the entry corresponding to the phase ID is not in use." Processing then resumes at block 610 of FIG. 6B. If it is determined at decision block 606 that the entry 200(0) is in use, processing proceeds to block 610 of FIG. 6B.

Figure 6B:
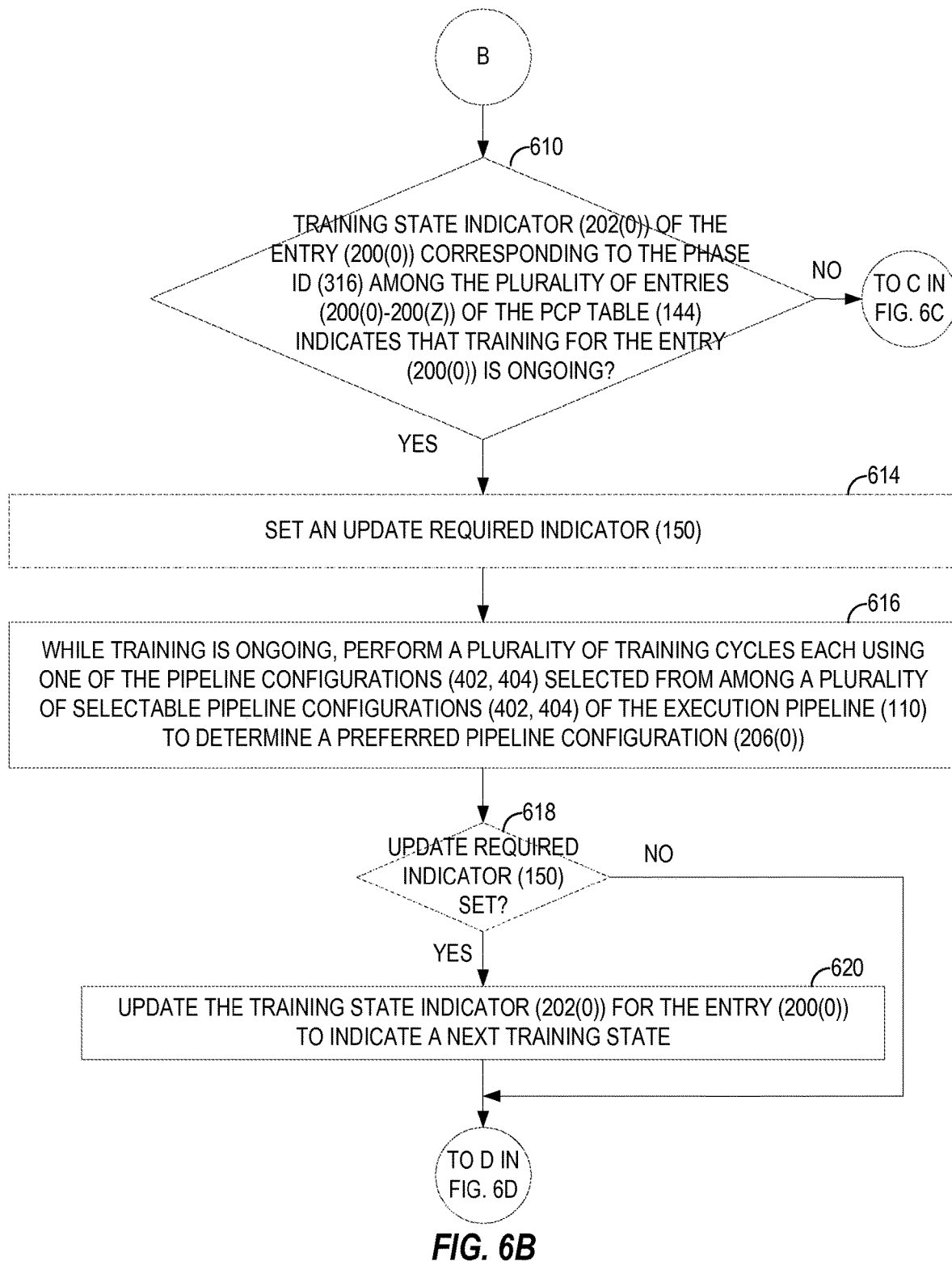

Referring now to FIG. 6B, the pipeline reconfiguration circuit 102 next determines whether the training state indicator 202(0) of the entry 200(0) corresponding to the phase ID 316 among the plurality of entries 200(0)-200(Z) of the PCP table 144 indicates that training for the phase 300(0) is ongoing (block 610). The pipeline reconfiguration circuit 102 may thus be referred to herein as "a means for determining whether a training state indicator of an entry corresponding to the phase ID among a plurality of entries of a pipeline configuration prediction (PCP) table indicates that training for the phase is ongoing." If it is determined at decision block 610 that training is not ongoing, processing resumes at block 612 of FIG. 6C. However, if it is determined at decision block 610 that training is ongoing, the pipeline reconfiguration circuit 102 in some aspects may set an update required indicator 150 (block 614). In this regard, the pipeline reconfiguration circuit 102 may be referred to herein as "a means for setting an update required indicator, responsive to determining that the training state indicator for the entry indicates that training for the phase is ongoing." While training is ongoing, the pipeline reconfiguration circuit 102 performs a plurality of training cycles, each using one of the pipeline configurations 402, 404 selected from among a plurality of selectable pipeline configurations 402, 404 of the execution pipeline 110 to determine a preferred pipeline configuration 206(0) (block 616). Accordingly, the pipeline reconfiguration circuit 102 may be referred to herein as "a means for performing a plurality of training cycles each using a pipeline configuration selected from among a plurality of selectable pipeline configurations of the execution pipeline to determine a preferred pipeline configuration." As discussed below in greater detail with respect to FIG. 7, in some aspects, each of the plurality of training cycles may be associated with a single one of the pipeline configurations 402, 404 depending on the value of the training state indicator 202(0). It is further understood that a single training cycle of the plurality of training cycles may be initiated responsive to an occurrence of the phase 300(1) within the execution pipeline 110 of the OOO computer processor 100.

In some aspects, the pipeline reconfiguration circuit 102 may next determine whether the update required indicator 150 is set (block 618). If it is determined at decision block 618 that the update required indicator 150 is set (or if the update required indicator 150 is not in use by a given aspect), the pipeline reconfiguration circuit 102 updates the training state indicator 202(0) for the entry 200(0) to indicate a next training state (block 620). In this regard, the pipeline reconfiguration circuit 102 may be referred to herein as "a means for updating the training state indicator for the entry [is] responsive to the update required indicator being set." Processing then resumes at block 622 of FIG. 6D. If it is determined at decision block 618 that the update required indicator 150 is not set, processing resumes at block 622 of FIG. 6D.

Figure 6C:
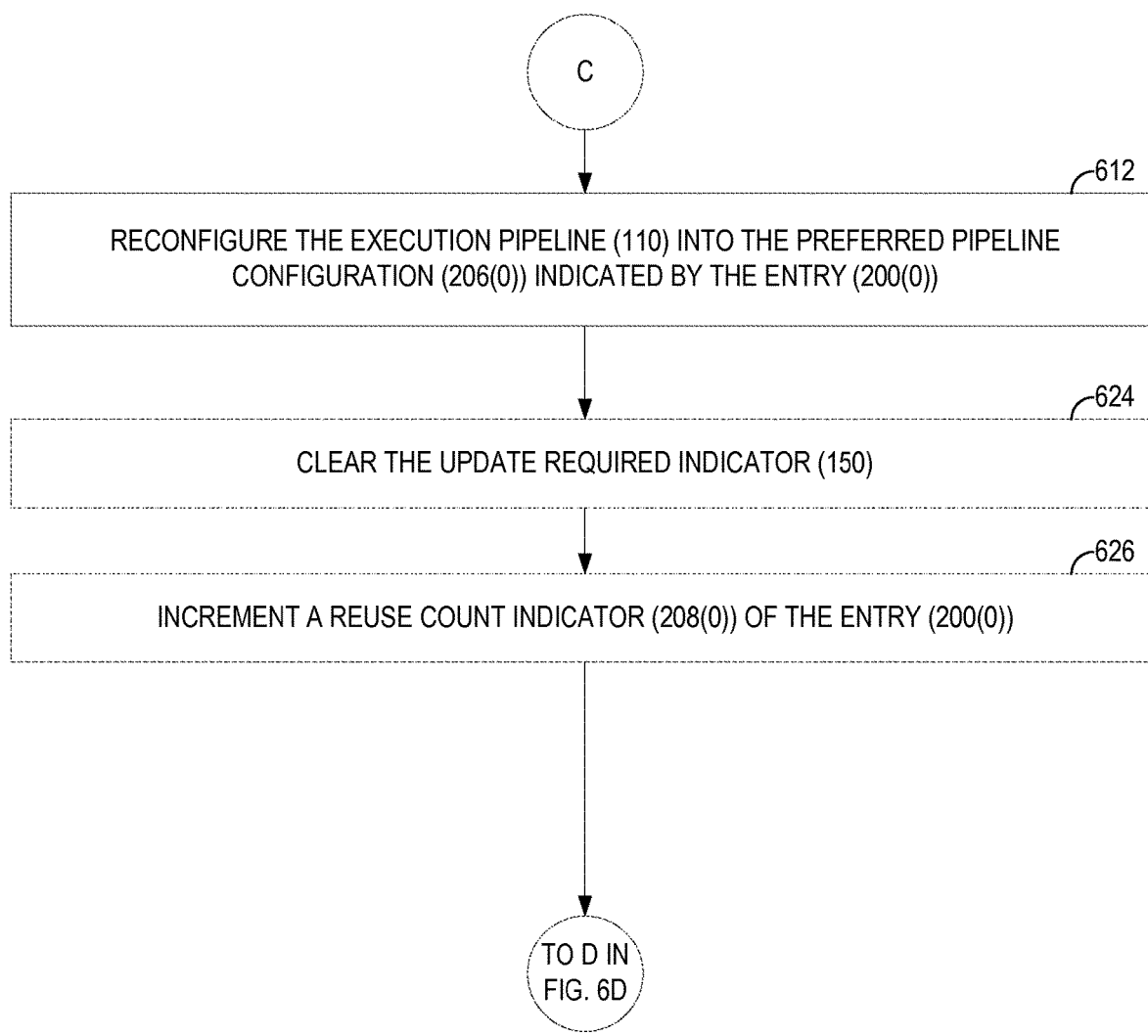

As noted above, if it is determined by the pipeline reconfiguration circuit 102 at decision block 610 that training is not ongoing, processing resumes at block 612 of FIG. 6C. The pipeline reconfiguration circuit 102 reconfigures the execution pipeline 110 into the preferred pipeline configuration 206(0) indicated by the entry 200(0) (block 612). Accordingly, the pipeline reconfiguration circuit 102 may be referred to herein as "a means for reconfiguring the execution pipeline into the preferred pipeline configuration indicated by the entry." The pipeline reconfiguration circuit 102 according to some aspects may then clear the update required indicator 150 (block 624). The pipeline reconfiguration circuit 102 may thus be referred to herein as "a means for clearing the update required indicator." In some aspects, the pipeline reconfiguration circuit 102 may also increment a reuse count indicator 208(0) of the entry 200(0) (block 626). In this regard, the pipeline reconfiguration circuit 102 may be referred to herein as "a means for incrementing a reuse count indicator of the entry." Processing then resumes at block 622 of FIG. 6D.

Figure 6D:
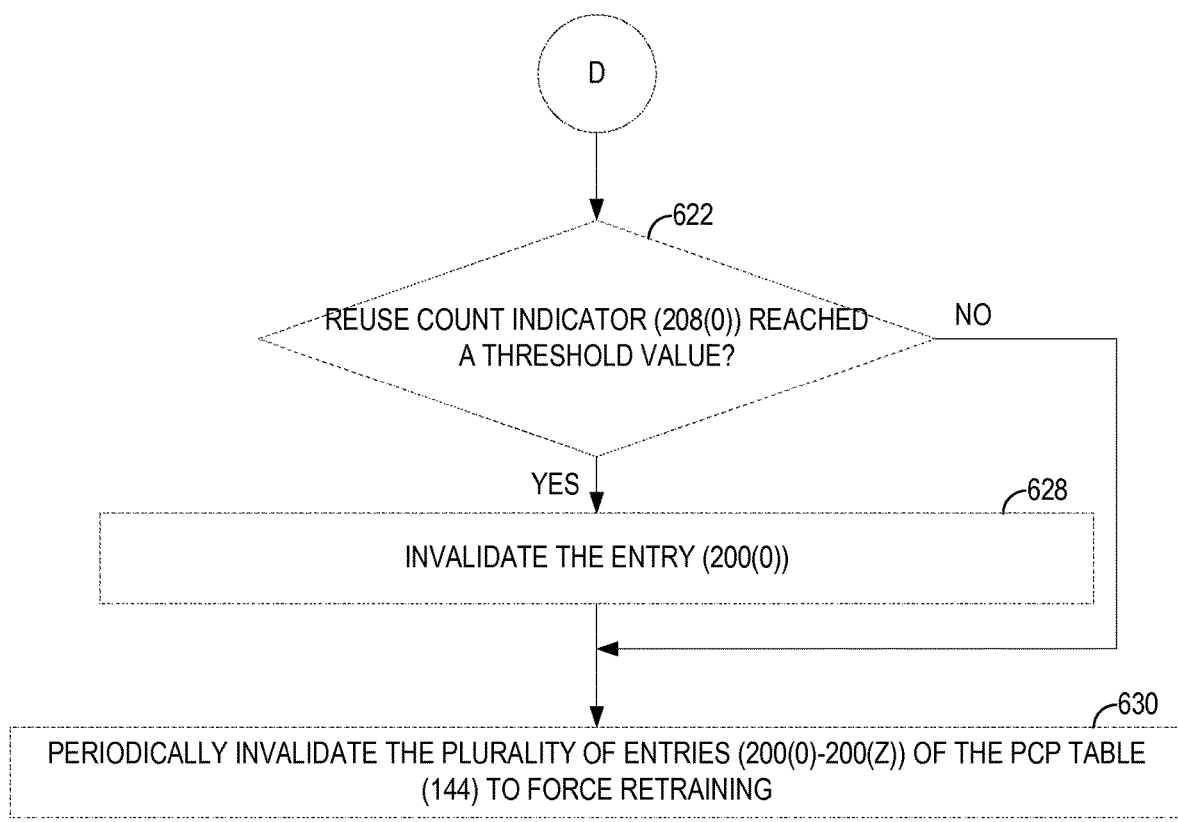

Turning now to FIG. 6D, the pipeline reconfiguration circuit 102 in some aspects may determine whether the reuse count indicator 208(0) has reached a threshold value (block 622). Accordingly, the pipeline reconfiguration circuit 102 may be referred to herein as "a means for determining whether the reuse count indicator for the entry has reached a threshold value." If the reuse count indicator 208(0) is determined to have reached the threshold value, the pipeline reconfiguration circuit 102 may invalidate the entry 200(0) (block 628). The pipeline reconfiguration circuit 102 may thus be referred to herein as "a means for invalidating the entry responsive to determining that the reuse count indicator for the entry has reached a threshold value." According to some aspects, the pipeline reconfiguration circuit 102 may periodically invalidate the plurality of entries 200(0)-200(Z) of the PCP table 144 to force retraining (block 630). In this regard, the pipeline reconfiguration circuit 102 may be referred to herein as "a means for periodically invalidating the plurality of entries of the PCP table to force retraining."

Figure 7:
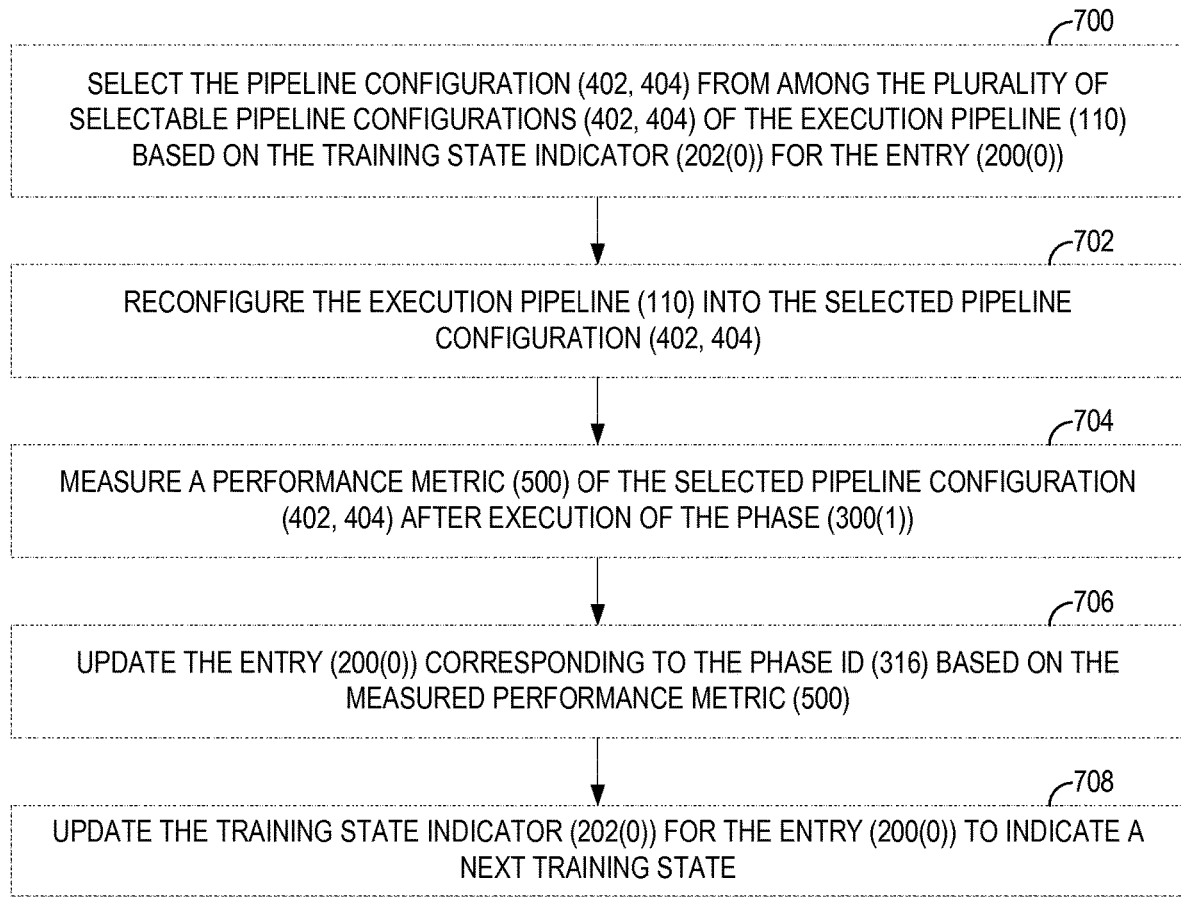
FIG. 7 is a flowchart illustrating exemplary operations for performing a training cycle by the pipeline reconfiguration circuit of FIG. 1.

FIG. 7 is a flowchart illustrating exemplary operations for performing a training cycle by the pipeline reconfiguration circuit 102 of FIG. 1. The operations illustrated herein may correspond to the operations of block 616 of FIG. 6B in some aspects. For the sake of clarity, elements of FIGS. 1-5 are referenced in describing FIG. 7. In FIG. 7, the pipeline reconfiguration circuit 102 selects the pipeline configuration 402, 404 from among the plurality of selectable pipeline configurations 402, 404 of the execution pipeline 110 based on the training state indicator 202(0) for the entry 200(0) (block 700). Accordingly, the pipeline reconfiguration circuit 102 may be referred to herein as "a means for selecting the pipeline configuration from among the plurality of selectable pipeline configurations of the execution pipeline based on the training state indicator for the entry." The pipeline reconfiguration circuit 102 then reconfigures the execution pipeline 110 into the selected pipeline configuration 402, 404 (block 702). The pipeline reconfiguration circuit 102 thus may be referred to herein as "a means for reconfiguring the execution pipeline into the selected pipeline configuration."

The pipeline reconfiguration circuit 102 next measures a performance metric 500 of the preferred pipeline configuration 206(0) after execution of the phase 300(1) (block 704). In this regard, the pipeline reconfiguration circuit 102 may be referred to herein as "a means for measuring a performance metric of the selected pipeline configuration after execution of the phase." The pipeline reconfiguration circuit 102 updates the entry 200(0) corresponding to the phase ID 316 based on the measured performance metric 500 (block 706). Accordingly, the pipeline reconfiguration circuit 102 may be referred to herein as "a means for updating the entry corresponding to the phase ID based on the measured performance metric." The pipeline reconfiguration circuit 102 then updates the training state indicator 202(0) for the entry 200(0) to indicate a next training state (block 708). The pipeline reconfiguration circuit 102 may thus be referred to herein as "a means for updating the training state indicator for the entry to indicate a next training state."

Reconfiguring execution pipelines of OOO computer processors based on phase training and prediction according to aspects disclosed herein may be provided in or integrated into any processor-based device. Examples, without limitation, include a set top box, an entertainment unit, a navigation device, a communications device, a fixed location data unit, a mobile location data unit, a mobile phone, a cellular phone, a smart phone, a tablet, a phablet, a computer, a portable computer, a desktop computer, a personal digital assistant (PDA), a monitor, a computer monitor, a television, a tuner, a radio, a satellite radio, a music player, a digital music player, a portable music player, a digital video player, a video player, a digital video disc (DVD) player, a portable digital video player, and an automobile.

Figure 8:
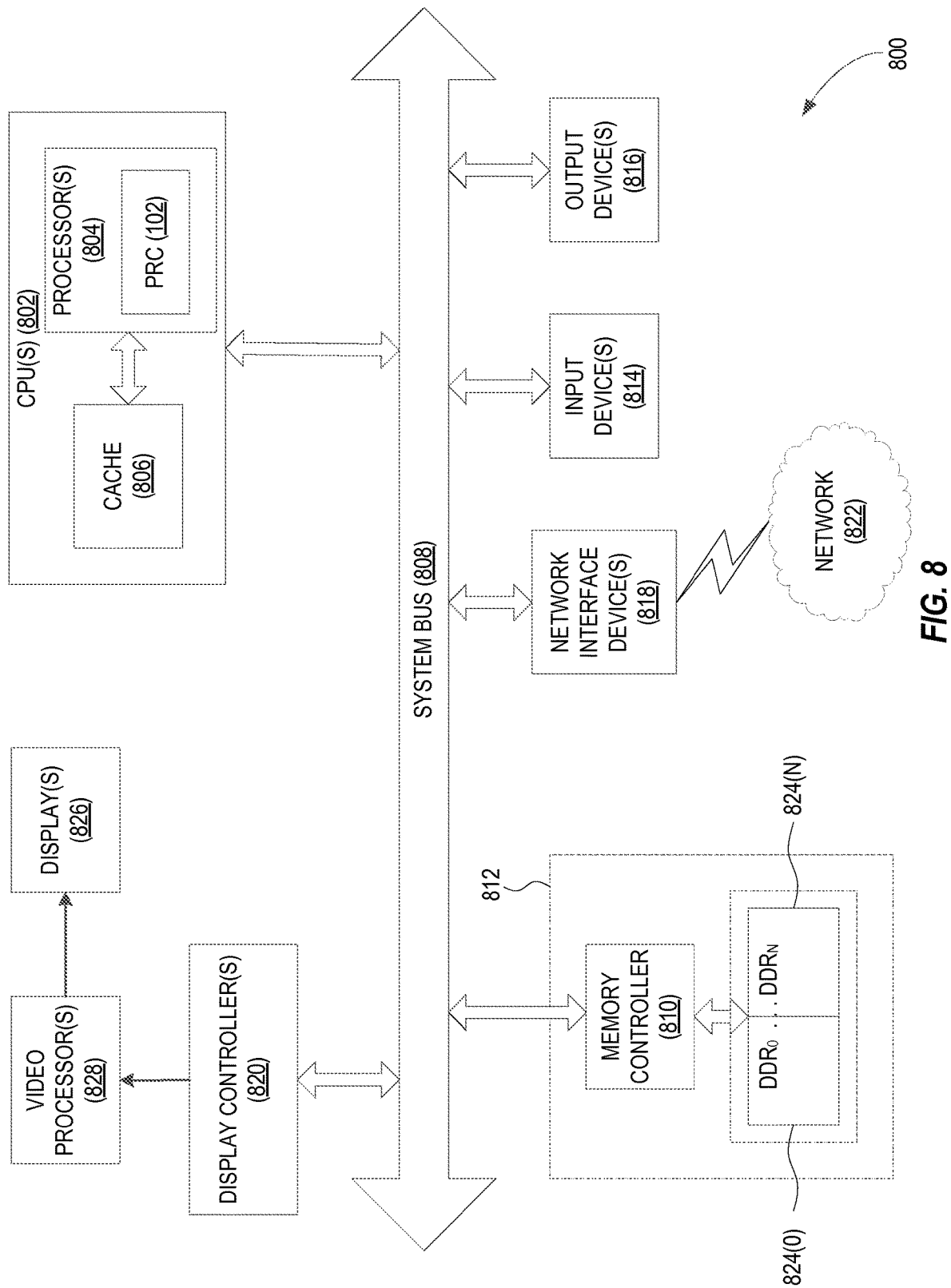
FIG. 8 is a block diagram of an exemplary processor-based system that can include the pipeline reconfiguration circuit of FIG. 1.

In this regard, FIG. 8 illustrates an example of a processor-based system 800 that can employ the pipeline reconfiguration circuit (PRC) 102 illustrated in FIG. 1. The processor-based system 800 includes one or more central processing units (CPUs) 802, each including one or more processors 804. The CPU(s) 802 may correspond to the OOO computer processor 100 in FIG. 1 in some aspects. The CPU(s) 802 may have cache memory 806 coupled to the processor(s) 804 for rapid access to temporarily stored data. The CPU(s) 802 is coupled to a system bus 808 and can intercouple master and slave devices included in the processor-based system 800. As is well known, the CPU(s) 802 communicates with these other devices by exchanging address, control, and data information over the system bus 808. For example, the CPU(s) 802 can communicate bus transaction requests to a memory controller 810 as an example of a slave device.

Other master and slave devices can be connected to the system bus 808. As illustrated in FIG. 8, these devices can include a memory system 812, one or more input devices 814, one or more output devices 816, one or more network interface devices 818, and one or more display controllers 820, as examples. The input device(s) 814 can include any type of input device, including but not limited to input keys, switches, voice processors, etc. The output device(s) 816 can include any type of output device, including, but not limited to, audio, video, other visual indicators, etc. The network interface device(s) 818 can be any devices configured to allow exchange of data to and from a network 822. The network 822 can be any type of network, including, but not limited to, a wired or wireless network, a private or public network, a local area network (LAN), a wireless local area network (WLAN), a wide area network (WAN), a BLUETOOTH™ network, and the Internet. The network interface device(s) 818 can be configured to support any type of communications protocol desired. The memory system 812 can include one or more memory units 824(0-N).

The CPU(s) 802 may also be configured to access the display controller(s) 820 over the system bus 808 to control information sent to one or more displays 826. The display controller(s) 820 sends information to the display(s) 826 to be displayed via one or more video processors 828, which process the information to be displayed into a format suitable for the display(s) 826. The display(s) 826 can include any type of display, including, but not limited to, a cathode ray tube (CRT), a liquid crystal display (LCD), a plasma display, etc.

Those of skill in the art will further appreciate that the various illustrative logical blocks, modules, circuits, and algorithms described in connection with the aspects disclosed herein may be implemented as electronic hardware. The master devices and slave devices described herein may be employed in any circuit, hardware component, integrated circuit (IC), or IC chip, as examples. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends upon the particular application, design choices, and/or design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

It is also noted that the operational steps described in any of the exemplary aspects herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary aspects may be combined. It is to be understood that the operational steps illustrated in the flowchart diagrams may be subject to numerous different modifications as will be readily apparent to one of skill in the art. Those of skill in the art will also understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein, but is to be accorded the widest scope consistent with the principles and novel features disclosed herein.

What is claimed is:

1. A pipeline reconfiguration circuit of an out-of-order (OOO) computer processor,
   the pipeline reconfiguration circuit comprising a pipeline configuration prediction (PCP) table comprising a plurality of entries, and communicatively coupled to an execution pipeline that provides a plurality of selectable pipeline configurations; and
   the pipeline reconfiguration circuit configured to, for each phase of a plurality of phases of committed instructions within the execution pipeline:
      generate a phase identifier (ID) for a preceding phase immediately prior to the phase by hashing a plurality of program counters of a plurality of committed backward branch instructions within the preceding phase;
      determine whether a training state indicator of an entry corresponding to the phase ID among the plurality of entries of the PCP table indicates that training for the phase is ongoing, wherein the phase ID is used as an index into the PCP table to access the entry corresponding to the phase ID among the plurality of entries of the PCP table;
      responsive to determining that the training state indicator for the entry indicates that training for the phase is ongoing, perform a plurality of training cycles each using a pipeline configuration selected from among the plurality of selectable pipeline configurations of the execution pipeline to determine a preferred pipeline configuration; and
      responsive to determining that the training state indicator for the entry indicates that training for the phase is not ongoing, reconfigure the execution pipeline into the preferred pipeline configuration indicated by the entry.

2. The pipeline reconfiguration circuit of claim 1, configured to perform the plurality of training cycles each using the pipeline configuration selected from among the plurality of selectable pipeline configurations of the execution pipeline to determine the preferred pipeline configuration by:
   selecting the pipeline configuration from among the plurality of selectable pipeline configurations of the execution pipeline based on the training state indicator for the entry;

reconfiguring the execution pipeline into the selected pipeline configuration;
measuring a performance metric of the selected pipeline configuration after execution of the phase;
updating the entry corresponding to the phase ID based on the measured performance metric; and
updating the training state indicator for the entry to indicate a next training state.

3. The pipeline reconfiguration circuit of claim 2, wherein the measured performance metric comprises an execution cycle count.

4. The pipeline reconfiguration circuit of claim 1, wherein the plurality of committed backward branch instructions within the preceding phase are selected from the group consisting of one or more most recent backward not-taken conditional branch instructions, one or more most recent backward call instructions, and one or more most recent backward return instructions, and combinations thereof.

5. The pipeline reconfiguration circuit of claim 1, further comprising a phase ID shift register configured to store a plurality of generated phase IDs;
the execution pipeline configured to generate the phase ID by hashing one or more generated phase IDs stored in the phase ID shift register.

6. The pipeline reconfiguration circuit of claim 1, wherein the plurality of selectable pipeline configurations are selected from the group consisting of a plurality of execution pipeline issue width configurations, a plurality of reservation station bank configurations, a plurality of instruction ordering configurations, a plurality of hardware prefetcher setting configurations, a plurality of branch predictor setting configurations, and a plurality of memory dependence predictor aggressiveness setting configurations, and combinations thereof.

7. The pipeline reconfiguration circuit of claim 1, further configured to, prior to determining whether the training state indicator of the entry corresponding to the phase ID among the plurality of entries of the PCP table indicates that training for the phase is ongoing:
determine whether the entry corresponding to the phase ID in the PCP table is in use; and
responsive to determining that the entry corresponding to the phase ID is not in use, initialize the training state indicator for the entry.

8. The pipeline reconfiguration circuit of claim 1, further configured to periodically invalidate the plurality of entries of the PCP table to force retraining.

9. The pipeline reconfiguration circuit of claim 1, further configured to:
responsive to determining that the training state indicator for the entry indicates that training for the phase is not ongoing, increment a reuse count indicator for the entry;
determine whether the reuse count indicator for the entry has reached a threshold value; and
responsive to determining that the reuse count indicator for the entry has reached the threshold value, invalidate the entry.

10. The pipeline reconfiguration circuit of claim 1, further comprising an update required indicator;
the pipeline reconfiguration circuit further configured to:
responsive to determining that the training state indicator for the entry indicates that training for the phase is ongoing, set the update required indicator;
responsive to determining that the training state indicator for the entry indicates that training for the phase is not ongoing, clear the update required indicator; and update the training state indicator for the entry responsive to the update required indicator being in a set state.

11. The pipeline reconfiguration circuit of claim 1 integrated into an integrated circuit (IC).

12. The pipeline reconfiguration circuit of claim 1 integrated into a device selected from the group consisting of: a set top box; an entertainment unit; a navigation device; a communications device; a fixed location data unit; a mobile location data unit; a mobile phone; a cellular phone; a smart phone; a tablet; a phablet; a computer; a portable computer; a desktop computer; a personal digital assistant (PDA); a monitor; a computer monitor; a television; a tuner; a radio; a satellite radio; a music player; a digital music player; a portable music player; a digital video player; a video player; a digital video disc (DVD) player; a portable digital video player; and an automobile.

13. An out-of-order (OOO) processor-based system, comprising:
an execution pipeline that provides a plurality of selectable pipeline configurations;
a pipeline reconfiguration circuit comprising a pipeline configuration prediction (PCP) table comprising a plurality of entries, and communicatively coupled to the execution pipeline; and
the pipeline reconfiguration circuit configured to, for each phase of a plurality of phases of committed instructions within the execution pipeline:
generate a phase identifier (ID) for a preceding phase immediately prior to the phase by hashing a plurality of program counters of a plurality of committed backward branch instructions within the preceding phase;
determine whether a training state indicator of an entry corresponding to the phase ID among the plurality of entries of the PCP table indicates that training for the phase is ongoing, wherein the phase ID is used as an index into the PCP table to access the entry corresponding to the phase ID among the plurality of entries of the PCP table;
responsive to determining that the training state indicator for the entry indicates that training for the phase is ongoing, perform a plurality of training cycles each using a pipeline configuration selected from among the plurality of selectable pipeline configurations of the execution pipeline to determine a preferred pipeline configuration; and
responsive to determining that the training state indicator for the entry indicates that training for the phase is not ongoing, reconfigure the execution pipeline into the preferred pipeline configuration indicated by the entry.

14. A pipeline reconfiguration circuit of an out-of-order (OOO) computer processor, comprising:
for each phase of a plurality of phases of committed instructions within an execution pipeline of the OOO computer processor:
a means for generating a phase identifier (ID) for a preceding phase immediately prior to the phase by hashing a plurality of program counters of a plurality of committed backward branch instructions within the preceding phase;
a means for determining whether a training state indicator of an entry corresponding to the phase ID among a plurality of entries of a pipeline configuration prediction (PCP) table indicates that training for the phase is ongoing, wherein the phase ID is used as an index into the PCP table to access the entry corresponding to the phase ID among the plurality of entries of the PCP table;

a means for performing a plurality of training cycles each using a pipeline configuration selected from among a plurality of selectable pipeline configurations of the execution pipeline to determine a preferred pipeline configuration, responsive to determining that the training state indicator for the entry indicates that training for the phase is ongoing; and a means for reconfiguring the execution pipeline into the preferred pipeline configuration indicated by the entry, responsive to determining that the training state indicator for the entry indicates that training for the phase is not ongoing.

15. The pipeline reconfiguration circuit of claim 14, wherein the means for performing the plurality of training cycles each using the pipeline configuration selected from among the plurality of selectable pipeline configurations of the execution pipeline to determine the preferred pipeline configuration comprises:

a means for selecting the pipeline configuration from among the plurality of selectable pipeline configurations of the execution pipeline based on the training state indicator for the entry;

a means for reconfiguring the execution pipeline into the selected pipeline configuration;

a means for measuring a performance metric of the selected pipeline configuration after execution of the phase;

a means for updating the entry corresponding to the phase ID based on the measured performance metric; and a means for updating the training state indicator for the entry to indicate a next training state.

16. The pipeline reconfiguration circuit of claim 15, wherein the measured performance metric comprises an execution cycle count.

17. The pipeline reconfiguration circuit of claim 14, wherein the plurality of committed backward branch instructions within the preceding phase are selected from the group consisting of one or more most recent backward not-taken conditional branch instructions, one or more most recent backward call instructions, and one or more most recent backward return instructions, and combinations thereof.

18. The pipeline reconfiguration circuit of claim 14, wherein the means for generating the phase ID comprises a means for hashing one or more generated phase IDs stored in a phase ID shift register.

19. The pipeline reconfiguration circuit of claim 14, wherein the plurality of selectable pipeline configurations are selected from the group consisting of a plurality of execution pipeline issue width configurations, a plurality of reservation station bank configurations, a plurality of instruction ordering configurations, a plurality of hardware prefetcher setting configurations, a plurality of branch predictor setting configurations, and a plurality of memory dependence predictor aggressiveness setting configurations, and combinations thereof.

20. The pipeline reconfiguration circuit of claim 14, further comprising:

a means for determining, prior to determining whether the training state indicator of the entry corresponding to the phase ID among the plurality of entries of the PCP table indicates that training for the phase is ongoing, whether the entry corresponding to the phase ID in the PCP table is in use; and a means for initializing the training state indicator for the entry responsive to determining that the entry corresponding to the phase ID is not in use.

21. The pipeline reconfiguration circuit of claim 14, further comprising a means for periodically invalidating the plurality of entries of the PCP table to force retraining.

22. The pipeline reconfiguration circuit of claim 14, further comprising:

a means for incrementing a reuse count indicator of the entry, responsive to determining that the training state indicator for the entry indicates that training for the phase is not ongoing;

a means for determining whether the reuse count indicator for the entry has reached a threshold value; and a means for invalidating the entry responsive to determining that the reuse count indicator for the entry has reached the threshold value.

23. The pipeline reconfiguration circuit of claim 14, further comprising:

a means for setting an update required indicator, responsive to determining that the training state indicator for the entry indicates that training for the phase is ongoing;

a means for clearing the update required indicator, responsive to determining that the training state indicator for the entry indicates that training for the phase is not ongoing; and a means for updating the training state indicator for the entry responsive to the update required indicator being in a set state.

24. A method of reconfiguring an execution pipeline of an out-of-order (OOO) computer processor, comprising:

for each phase of a plurality of phases of committed instructions within an execution pipeline of the OOO computer processor:

generating, by a pipeline reconfiguration circuit, a phase identifier (ID) for a preceding phase immediately prior to the phase by hashing a plurality of program counters of a plurality of committed backward branch instructions within the preceding phase;

determining whether a training state indicator of an entry corresponding to the phase ID among a plurality of entries of a pipeline configuration prediction (PCP) table indicates that training for the phase is ongoing, wherein the phase ID is used as an index into the PCP table to access the entry corresponding to the phase ID among the plurality of entries of the PCP table;

responsive to determining that the training state indicator for the entry indicates that training for the phase is ongoing, performing a plurality of training cycles each using a pipeline configuration selected from among a plurality of selectable pipeline configurations of the execution pipeline to determine a preferred pipeline configuration; and responsive to determining that the training state indicator for the entry indicates that training for the phase is not ongoing, reconfiguring the execution pipeline into the preferred pipeline configuration indicated by the entry.

25. The method of claim 24, wherein performing the plurality of training cycles each using the pipeline configuration selected from among the plurality of selectable pipeline configurations of the execution pipeline to determine the preferred pipeline configuration comprises:

selecting the pipeline configuration from among the plurality of selectable pipeline configurations of the execution pipeline based on the training state indicator for the entry;
reconfiguring the execution pipeline into the selected pipeline configuration;
executing the phase using the selected pipeline configuration;
measuring a performance metric of the selected pipeline configuration;
updating the entry corresponding to the phase ID based on the measured performance metric; and
updating the training state indicator for the entry to indicate a next training state.

26. The method of claim 25, wherein the measured performance metric comprises an execution cycle count.

27. The method of claim 24, wherein the plurality of committed backward branch instructions within the preceding phase are selected from the group consisting of one or more most recent backward not-taken conditional branch instructions, one or more most recent backward call instructions, and one or more most recent backward return instructions, and combinations thereof.

28. The method of claim 24, wherein generating the phase ID comprises hashing one or more generated phase IDs stored in a phase ID shift register.

29. The method of claim 24, wherein the plurality of selectable pipeline configurations are selected from the group consisting of a plurality of execution pipeline issue width configurations, a plurality of reservation station bank configurations, a plurality of instruction ordering configurations, a plurality of hardware prefetcher setting configurations, a plurality of branch predictor setting configurations, and a plurality of memory dependence predictor aggressiveness setting configurations, and combinations thereof.

30. The method of claim 24, further comprising:
determining, prior to determining whether the training state indicator of the entry corresponding to the phase ID among the plurality of entries of the PCP table indicates that training for the phase is ongoing, whether the entry corresponding to the phase ID in the PCP table is in use; and
responsive to determining that the entry corresponding to the phase ID is not in use, initializing the training state indicator for the entry.

31. The method of claim 24, further comprising periodically invalidating the plurality of entries of the PCP table to force retraining.

32. The method of claim 24, further comprising:
responsive to determining that the training state indicator for the entry indicates that training for the phase is not ongoing, incrementing a reuse count indicator for the entry;
determining whether the reuse count indicator for the entry has reached a threshold value; and
responsive to determining that the reuse count indicator for the entry has reached the threshold value, invalidating the entry.

33. The method of claim 24, further comprising:
responsive to determining that the training state indicator for the entry indicates that training for the phase is ongoing, setting an update required indicator;
responsive to determining that the training state indicator for the entry indicates that training for the phase is not ongoing, clearing the update required indicator; and
updating the training state indicator for the entry responsive to the update required indicator being in a set state.

* * * * *